No. 631,192. Patented Aug. 15, 1899.
H. B. WILLIAMS.
TELEMETER.
(Application filed June 24, 1898.)
(No Model.) 2 Sheets—Sheet 1.
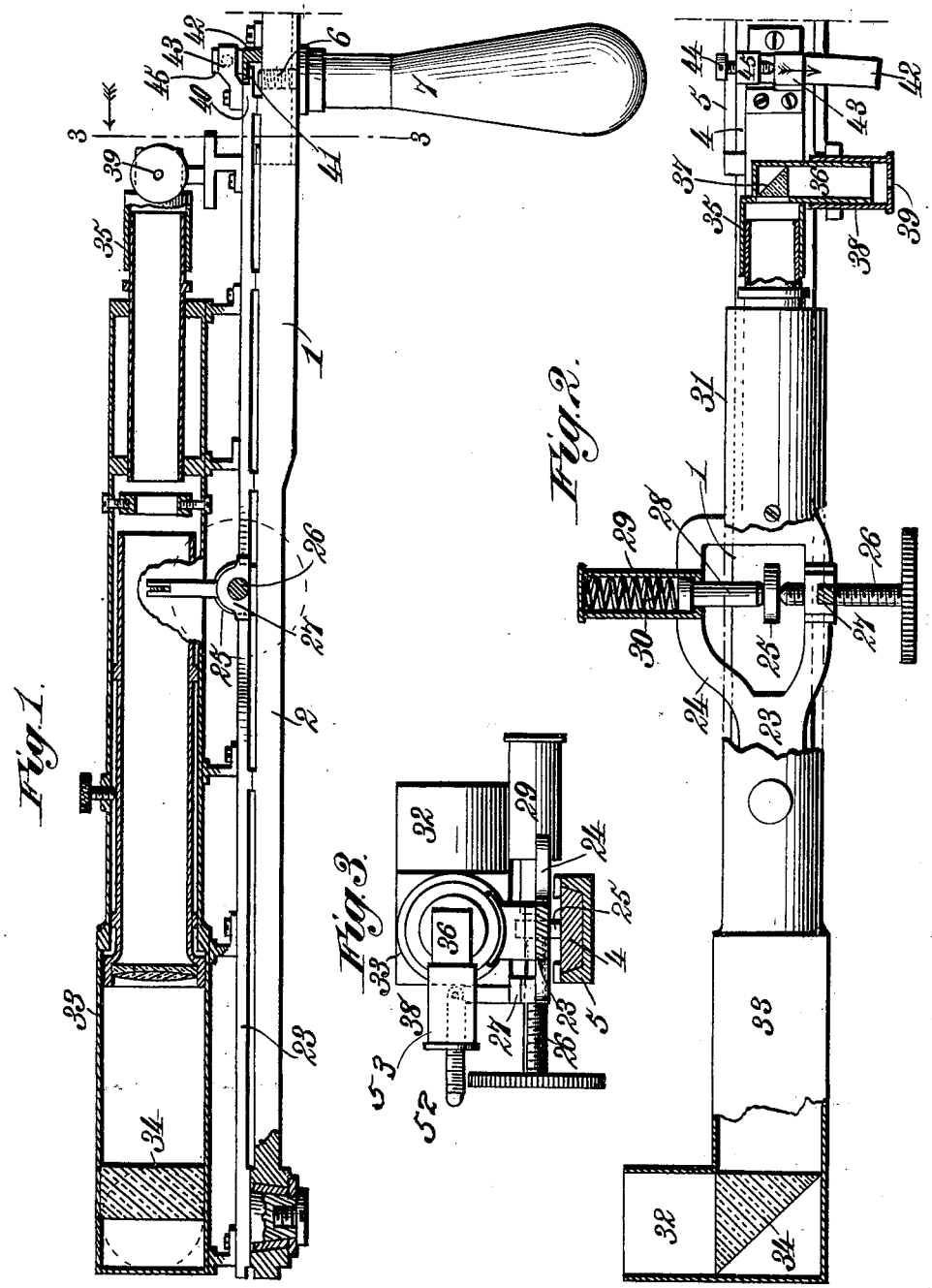

No. 631,192. Patented Aug. 15, 1899.
H. B. WILLIAMS.
TELEMETER.
(Application filed June 24, 1898.)
(No Model.) 2 Sheets—Sheet 2.
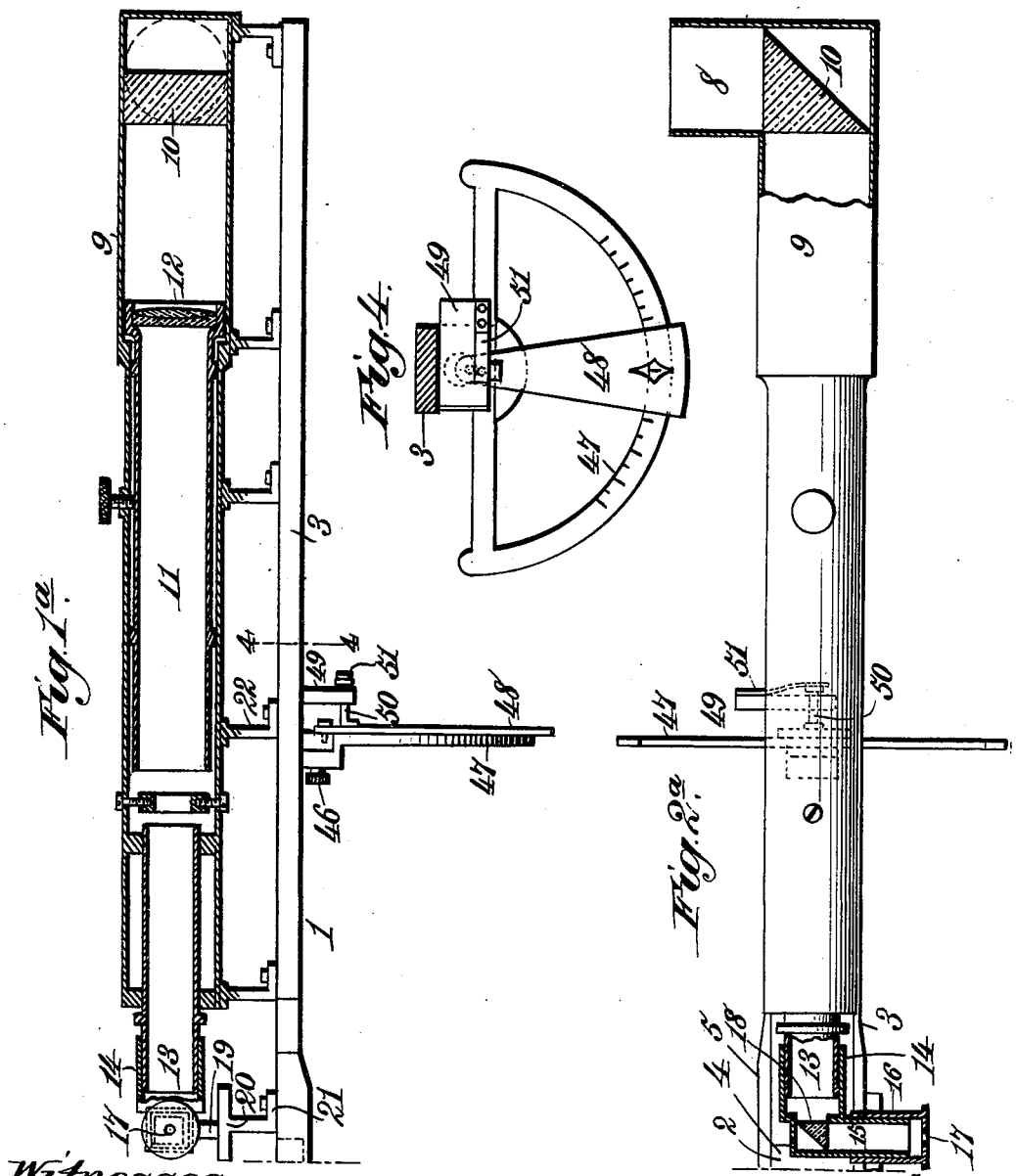
Witnesses.
Robert Everitt.
Inventor.
Herbert B. Williams.
By James L. Norris
Atty.
THE NORRIS PETERS CO., PHOTO-LITHO., WASHINGTON, D. C.

UNITED STATES PATENT OFFICE.

HERBERT B. WILLIAMS, OF CASTLEGATE, UTAH.

TELEMETER.

SPECIFICATION forming part of Letters Patent No. 631,192, dated August 15, 1899.

Application filed June 24, 1898. Serial No. 684,394. (No model.)

*To all whom it may concern:*

Be it known that I, HERBERT B. WILLIAMS, a citizen of the United States, residing at Castlegate, in the county of Carbon and State of Utah, have invented new and useful Improvements in Telemeters, of which the following is a specification.

This invention relates to telemeters, and has for its object to provide a simple, readily-operated, and portable instrument by means of which both the horizontal and vertical distances of objects may be quickly and accurately obtained; and to these ends my invention consists in the features and in the construction, arrangement, and combination of parts hereinafter described, and particularly pointed out in the claims following the description, reference being had to the accompanying drawings, forming a part of this specification, wherein—

Figure 1 is a vertical longitudinal central sectional view of one portion of my improved telemeter. Fig. 1ª is a similar view of the other portion thereof. These two views when placed end to end illustrate the complete instrument. Fig. 2 is a top plan view, partially in section, of that portion of the device illustrated in Fig. 1. Fig. 2ª is a similar view to Fig. 2, illustrating the other portion of the instrument. Fig. 3 is a transverse vertical section taken on the line 3 3 of Fig. 1, and Fig. 4 is a transverse sectional view taken on the line 4 4 of Fig. 1ª.

Referring to the drawings, the numeral 1 indicates the base of the instrument, consisting of two metallic strips or bars 2 and 3, respectively, provided at their adjacent ends with a tenon 4 and socket 5, which when fitted one within the other are fastened rigidly together by a threaded spindle 6, formed on or secured in the end of a handle 7. When the two bars 2 and 3 are thus attached, they are in alinement one with the other and form practically one continuous base. Fixed on one end of the base 1 is a right-angled tubular casing 8 9, the member 8 of which is accurately set at a right angle to the base and the other member 9 in true alinement therewith. Arranged in the angle of the casing 8 9 is a forty-five-degree reflecting-prism 10. Fixed on the base 1 in alinement with the member 9 of the tubular casing is a telescope 11, the objective end 12 of which is fitted and adapted to slide in the member 9. Fitted over the opposite end 13 of the telescope is a right-angled tubular casing 14 15, the member 14 of which is adapted to be adjusted longitudinally on the end 13, while over the other end of the member 15 is fitted a longitudinally-adjustable sighting-tube 16, provided with a peep-hole 17. Arranged in the angle of the casing 14 15 is a forty-five-degree reflecting-prism 18. The tubular casing 14 15 is provided with a leg 19, which rests on and is adapted to freely slide over a table or support 20, fixed to the base 1 by a bracket 21. By means of the described arrangement the prism 18 may be adjusted toward and from the end 13 of the telescope and the peep-hole 17 may in like manner be adjusted toward and from the prism 18.

I have illustrated the telescope 11 as fixed to the base 1 by bracket-arms 22; but it will be manifest to those skilled in the art that any other suitable supports may be provided for the purpose.

As has heretofore been explained, the members 8 and 15 of the tubular casings 8 9 and 14 15 are accurately fixed at true right angles to the telescope, and the line of collimation of the latter is parallel and in vertical alinement with the longitudinal axis of the base 1. Hence the light reflected from a sighted object is deflected by the prism 10 through the axis of the telescope and onto the prism 18, by which latter the light is again reflected at an angle of ninety degrees, thus bringing the rays parallel with their original course from the object sighted and displaying the latter to view through the peep-hole 17. It will thus be apparent that when the object is accurately brought into view and centered in the manner described the base 1 must necessarily be at a true right angle to the object.

Pivoted to the outer end of the bar 2 of the base-plate is an arm 23, which is bifurcated or forked intermediate its ends, as at 24, and projecting through said forked portion is a lug 25, formed on or attached to the base 1. A gradienter-screw 26 is fitted in a threaded bearing 27 on one side of the arm 23 and engages one side of the lug 25, while a spring-pressed plunger 28 engages the opposite side of said lug. The plunger 28 is arranged in a cylinder 29, fixed on the arm 23, and is pressed forward into engagement with the lug 25 by a coiled spring 30, disposed in the cylinder. By screwing up the gradienter-screw 26 the arm 23 will swing upon its pivot in one direction, and by unscrewing said screw the spring-pressed plunger will swing the said arm in the opposite direction.

Fixed longitudinally on the arm 23 is a telescope 31, the objective of which is arranged to slide in one member of a right-angled tubular casing 32 33, fixed on the outer end of said arm. In said casing 32 33 is arranged a forty-five-degree reflecting-prism 34, and on the inner end of said telescope is adjustably fitted a tubular right-angled casing 35 36, provided with a forty-five-degree reflecting-prism 37 and having an adjustable sighting-tube 38, provided with a peep-hole 39. The construction and arrangement of the telescope, prisms, and casings and their supports are precisely the same as that before described and need not therefore be repeated in detail.

Attached to the end of the arm 23 is a segment 40, having a projection 41, which is adapted to move beneath a corresponding segment 42, fixed to the base 1. The projection 41 serves to hold the arm 23 securely in position parallel to the base-plate as it is moved by the gradienter-screw and prevents undue strain from coming on the axis of the movable arm. On the end of the arm 23 is fixed a lug 43, which when the arm is in zero position or in true alinement with the base-plate 1 rests against a stop-screw 44, tapped through a lug 45, attached to the segment 42, fixed to the base-plate.

To the under side of the arm 3 is removably attached by a screw 46 a graduated segment 47, to which is pivotally attached a pendent arm 48, provided with a sight-opening through which the graduations on the segment 47 may be viewed one at a time. A bracket 49 is also attached to the under side of the base in front of the segment 47 and has movably fitted therein a plunger 50, which is adapted to bear at one end against the arm 48. The plunger 50 is held forced against the arm by the free end of a leaf-spring 51, which at its other end is attached to the bracket 49. When not in actual use, the arm 48 is thus held against movement.

A graduated scale 52 is disposed at right angles to the head of the gradienter-screw and is supported in a fixed position by a bracket 53, as most clearly shown in Fig. 3. By means of this scale the angle formed by the tube 32 with the base 1 may be accurately measured.

The operation of my improved telemeter is as follows: After the bars 2 and 3 of the base 1 have been attached by the handle 7 the sight-tubes 16 and 38 are adjusted binocularly to suit the eyes of the observer. When in normal position, the collimation-lines of the two telescopes are coincident and the lug 43 will bear against the stop-screw 44, thus indicating that the movable arm 23 is at zero, and when the parts are in this position the gradienter-screw will also register zero. The instrument is held by the handle 7, with the peep-holes 17 and 39 to the eyes of the observer and the instrument trained until the object the distance to which it is desired to ascertain is sighted through the telescope 11. The gradienter-screw is then turned until the cross-wires of the telescope 31 cover the same point of the object viewed through the fixed telescope 11, when the gradienter-screw will indicate in degrees and fractions of degrees the angle subtended by the base 1 and the line of vision between the prism 34 and the object. The distance between the two prisms 10 and 34 being fixed and known, the angle of vision between the prism 10 and the object being a right angle and the angle between the prism 34 and the object being indicated by the gradienter-screw, a very simple calculation will give the distance of the object. In other words, we will then have given a right-angled triangle the base of which and the two angles at the base are known, and hence the vertical side of the angle, which represents the horizontal distance of the object, is easily ascertained.

By means of the arm the vertical angle of the object may be readily measured. To measure such angle, the plunger should be drawn out of contact with the arm 48 and the top of the object sighted, as before explained. When the line of collimation of the fixed telescope is horizontal, the pendent arm 48 will point to zero on its graduated segment; but in any other position the pendent arm 48, which remains suspended in a vertical position, will indicate on the segment which moves with the base the angle of elevation or depression of the line of sight. The direct distance of the object having been previously ascertained in the manner described and the vertical arc being indicated by the arm 48, the vertical and horizontal distance may be readily computed. In other words, when it is desired to measure the vertical height of an object the horizontal distance is first ascertained in the manner before described. The instrument is then tilted until the top of the object is centered on the cross-wires of the telescope, when the angle may be read on the segment 47. We will then have given a right-angled triangle the base and opposite angles of which are known, and the vertical side of the angle, which represents the height of the object, may be readily calculated.

Having described my invention, what I claim is—

1. In a telemeter, the combination with a base, of a telescope fixed longitudinally on one end thereof with its line of collimation parallel with the axial line of the base, an arm pivoted at its outer end to the opposite end of the base, means for swinging said arm about its pivot, a telescope fixed longitudinally on said arm, right-angled tubular casings arranged on the objective ends of the telescopes, forty-five-degree prisms arranged in said casings and operating to deflect the light axially through the telescope, right-angled tubular casings adjustably fitted over the inner ends of the telescopes, sighting-tubes adjustably arranged over the free ends of said casings, and forty-five-degree prisms arranged in said casings and operating to deflect the light passing through the telescopes at right angles through the sighting-tubes, substantially as described.

2. In a telemeter, the combination with a base, of a telescope fixed longitudinally on one end thereof, an arm pivoted at its outer end to the opposite end of the base, a telescope fixed longitudinally on said arm, a lug rigid with the base, a gradienter-screw carried by the arm and arranged to engage the lug and move the arm in one direction, a spring-actuated plunger for moving the arm in the opposite direction, right-angled tubular casings arranged on the objective ends of the telescopes, forty-five-degree prisms arranged in said casings, right-angled tubular casings fitted over the inner ends of the telescopes, sighting-tubes on the free ends of said casings, and forty-five-degree prisms arranged in said casings, substantially as described.

3. In a telemeter, the combination with a base, and means carried thereby for ascertaining the distance of an object, of a graduated segment fixed to the under side of the base, a pendent arm pivotally attached to the segment and operating to indicate the vertical arc subtended by the object, a plunger adapted at one end to bear against said arm to hold it stationary, and a spring bearing against the other end of said plunger to hold it in engagement with the arm, substantially as described.

In testimony whereof I have hereunto set my hand in presence of two subscribing witnesses.

HERBERT B. WILLIAMS.

Witnesses:
   LOUIS NATER,
   GEO. W. POWERS.